United States Patent Office 3,173,967
Patented Mar. 16, 1965

3,173,967
ISOMERIZATION OF INTERNAL OLEFINS TO TERMINAL OLEFINS
Herbert C. Brown, 1840 Garden St., West Lafayette, Ind.
No Drawing. Filed May 28, 1958, Ser. No. 738,271
11 Claims. (Cl. 260—683.2)

This invention relates to the isomerization of internal olefins into α-olefins.

There is available to the public sources and a supply of internal olefinic hydrocarbons. Such materials are, however, not of extensive use other than, for example, as solvents or in fuels for internal combustion engines. Even their use in internal combustion engines is not attractive since such olefins contribute toward the lack of stability of such fuels. It is desirable to provide additional uses for the internal olefins or to transform them into materials having greater utility.

An object of this invention is to provide a process for the conversion or isomerization of internal olefins into terminal or α-olefins. A specific object is to provide a catalytic process for isomerizing internal olefins into α-olefins. These and other objects will be evident as the discussion proceeds.

It has now been found that internal olefinic hydrocarbons, that is those in which the unsaturation is not in the terminal position, can be isomerized to α- or 1-olefins by contacting them with organoboron compounds. The internal olefins to which the process is particularly adaptable are those straight chain olefinic hydrocarbons in which the double bond is in the 2 position. Alkylboron compounds, particularly those having the same number of carbon atoms in each alkyl chain as does the internal olefin to be treated, are especially preferred. The process can be conducted at temperatures between about 0 to 250° C. but best results are obtained employing temperatures between 100 to 200° C. The amount of organoboron compound employed is generally not critical but is preferably of the order of 5 to 40 mole percent based upon the amount of internal olefin present. A particularly preferred embodiment of the invention comprises the reaction of a straight chain internal hydrocarbon olefin having up to about 18 carbon atoms with a trialkyl boron compound in which each alkyl group has the same number of carbon atoms as the internal olefin treated at a temperature between 100 to 200° C. in the presence of a polyether. A still further embodiment of the invention comprises the simultaneous or rapid removal of the 1-olefin produced during the treatment of the internal olefin.

The process of this invention results in the conversion of internal olefins to α- or 1-olefins in high yield and purity. By the procedure the comparatively useless internal olefins are converted into terminal olefins which are of considerable use in the formation of polymers, reaction with boron or aluminum hydrides to produce the corresponding organometallic compounds, and the like.

The organoboron compounds used in effecting the isomerization are, in general, any such compounds having at least one boron to carbon linkage. They should, of course, be liquid or soluble in the reaction system and are preferably readily recoverable therefrom. Typical but not limiting examples of organoboron compounds which can be employed are the aliphatic and alicyclic boron compounds such as trimethylboron, triethylboron, trihexylboron, trioctylboron, tricyclopentyl boron, tricyclohexylboron, tri-methylcyclohexylboron, amyl boric acid, diethylboron, bromide, dimethyl, diborane, triethylboron-trimethylamine, trioctylboron triethylamine, and the like. The hydrocarbon groups can be further substituted provided such substituents are essentially inert in the reaction and not deleterious to the isomerization. The fully alkylated boron compounds, particularly those in which the organo radicals are straight chain alkyl hydrocarbon radicals having up to about 10 carbon atoms are especially preferred because of their greater availability and the enhanced results obtained. It is especially preferred to employ such fully alkylated boron compounds in which the alkyl groups contain the same number of carbon atoms as the number of carbon atoms contained in the internal olefin which is treated. Such result in more efficient isomerization and ready recovery of the product α-olefin therefrom. Mixtures of the aforementioned organoboron compounds can however be employed.

The internal olefins treated are, in general, those in which the double bond is contained between carbon atoms other than terminal carbon atoms of a straight or branched chain. Stated in other words, such olefins are those susceptible of migration of a double bond from an internal position to a terminal position. Included among such olefins are for example 2-pentene, 2-butene, 2-hexene, 2-methyl-3-heptene, 3-hexene, 2-octene, 3-octene, 4-decene, 4-octadecene, 2-methylamyl-3-hexene, β-methyl, ethyl, or isopropyl styrene, and the like. Such internal olefins can be further substituted with hydrocarbons and other functional groups which are essentially non-reactive in the system. The straight chain hydrocarbon internal olefins having up to about 18 carbon atoms are particularly preferred.

The amount of organoboron compound employed for treatment of the internal olefin can be varied over a considerable range. That is, it can be present in minute quantities as about 0.5 mole percent based on the internal olefin up to equimolar proportions and higher to still achieve the benefits of the present invention. Generally speaking, between about 5 to 40 mole percent of the organoboron compound based upon the internal olefin is employed. Catalytic proportions of the order of about 10 to 20 mole percent of organoboron based upon the internal olefin are preferably employed for best results.

The process of this invention is illustrated further by the following examples where, in each instance, all parts are by weight unless otherwise specified.

Example I

To a reactor equipped with internal agitation, external heating means and a means for addition and discharge of reactants and products is added 40 parts of tri-2-hexylboron. Then 100 parts of 2-hexene is added to the reactor. This mixture is heated to 100° C. under pressure and maintained at this temperature for a period of 24 hours. The mixture is then subjected to careful fractional distillation in a 100-plate column whereby 1-hexene is recovered as the fore-fraction.

A particularly preferred embodiment of this invention is to conduct the reaction under conditions whereby the terminal olefin product is removed essentially as produced. The following example will demonstrate this embodiment of the invention.

Example II

The reactor employed in Example I was equipped with a highly efficient fractionating column permitting the recovery of the product olefin during the course of reaction. To the reactor was added 50 parts of the diethyl ether of triethylene glycol and 30 parts of 2-octene. Next was added 17 millimoles of diborane which was placed into the olefin solution. This mixture was permitted to stand at room temperature for 2 hours whereby the organoboron catalyst was formed in situ. Then the mixture was heated to the reflux temperature and refluxed for 72 hours at 121 to 121.5° C., collecting 22.94 parts of condensate. When comparing the condensate by infrared analysis it was found that 28 percent of the condensate was pure 1-octene. The 1-octene can be used as obtained or further separated by additional fractional distillation.

Example III

A hydrocarbon stream containing mixed internal olefins in the 2, 3, and 4 positions of C-8 hydrocarbons is treated essentially as described in Example I using tri-n-octylboron, 15 mole percent, based on the amount of internal olefin in the mixture at a temperature of 175° C. for 15 hours. Essentially all of the internal olefins contained in the mixture are converted to α-olefins.

Example IV

Pentene-2 is treated in solution in tetrahydrofuran at 200° C. and autogenous pressure with tripentylboron, 20 mole percent, for 6 hours, followed by slow distillation in an efficient column. Pentene-1 is obtained in high yield.

Example V

Employing triethylamine-triethylboron complex as a catalyst octene-3 is converted to octene-1 when reacting for 10 hours at 125° C. and autogenous pressure.

Example VI

Tridecylboron in catalytic amount is employed to treat decene-2 at 180° C. in the presence of the methyl ethyl ether of diethylene glycol for 5 hours. Decene-1 is recovered in high yield when employing the procedure of Example II.

The above examples have been presented by way of illustration and it is not intended to limit the invention thereto. It is evident that any of the organoboron compounds heretofore mentioned and the internal olefins can be substituted to produce similar results.

Although a pressure operation is not an essential feature of the present invention some advantage is achieved in employing pressures above atmospheric particularly when any of the constituents of the reaction are low boiling materials. Pressures up to above 150 atmospheres are suitable but ordinarily pressure from 1 to 50 atmospheres are employed. Such provides a faster reaction rate and assures more intimate contact of the reactants.

As indicated above, a particularly preferred embodiment of the reaction is the continuous removal of the product terminal olefins as it is formed and during reaction. That is, the product is rapidly removed essentially as soon as it is formed. Since the terminal olefin in general, will have a boiling point about 10° C. lower than that of the internal olefin, a very efficient way in which to effect the reaction and separation of the product is by the employment of an efficient fractionating column. Essentially pure terminal olefin is recovered as rapidly as it is formed.

Certain of the above examples have shown the employment of diluents or solvents. It is to be understood that such are not ordinarily required. However, if desired, diluents including hydrocarbons, ethers, halogen aromatic compounds and tertiary amines can be employed. Among such diluents are included the hexanes, nonanes, decanes, cyclohexanes, benzene, toluene, diethyl ether, diamyl ether, methyl amyl ether, tetrahydrofuran, dioxane, the diethyl, dimethyl, and methyl ethyl ethers of diethylene glycol, benzyl chloride, phenyl chloride, tolyl bromide, trimethyl amine, methyl pyridine, triethyl amine and the like. Mixed ethers and amine compounds can also be employed, as for example, triethanolamine trimethyl, ethyl and the like ethers. The ethers and tertiary amines comprise preferred diluents because of their reaction promoting effect. The ethers, particularly tetrahydrofuran and the polyethers, such as the dimethyl ether of diethylene glycol are especially preferred because of their greater solubility for the reactants and products, thus providing ready recovery of the product. Additionally such ethers exhibit a greater catalytic or reaction promoting effect and even shorter reaction times are required when such are employed. The proportions of the diluents employed can be varied over a wide range. In a preferred operation between about 3 to 50 parts of diluent per part of the internal olefin are employed.

The process is readily adaptable to continuous processing techniques. For example, the organoboron compound whether pre-prepared or produced in situ by reaction of diborane with the internal olefin to be treated or another olefin can form a fluid system to which is fed the internal olefin with or without a solvent at a rate commensurate with the rate of removal preferably by distillation of the terminal olefin produced. In this manner there is simultaneous isomerization of the internal olefin and recovery of the product with the organoboron compound remaining as a fixed reactant.

As briefly mentioned above the terminal olefins produced by the present process are of considerable use. For example, when diethylaluminum hydride is reacted with the product produced in Example II diethyl octylaluminum is obtained in high yield. Similarly when diborane is reacted with the product produced in Example I tri-n-hexylboron is obtained. These materials can then be oxidized and hydrolyzed to produce the corresponding alcohols. Other uses will be evident to those skilled in the art.

Having thus described the process of this invention it is not intended that it be limited except as set forth in the following claims.

I claim:

1. A process for the isomerization of an internal mono-olefin to a terminal olefin which comprises reacting, at 100 to 250° C., an internal mono-olefin containing up to and including about 18 carbon atoms with a catalyst consisting essentially of a boron compound selected from the group consisting of aliphatic and alicyclic hydrocarbon boron compounds which are liquid in the reaction system, have at least one boron to carbon linkage, and wherein the hydrocarbon groups contain up to and including about 18 carbon atoms.

2. The process of claim 1 wherein the reaction is conducted at a temperature between about 100 to 200° C. and at least one hydrocarbon radical of said hydrocarbon boron compound contains the same number of carbon atoms as does said internal olefin.

3. The process for isomerizing octene-2 to octene-1 which comprises reacting octene-2 with between 10 to 20 mole percent of tri-n-octylboron at a temperature between 100 to 200° C. in the presence of the diethylether of diethylene glycol with simultaneous fractionation of the product.

4. A process for the isomerization of an internal mono-olefin to a terminal olefin which comprises reacting, at 100 to 250° C., an internal mono-olefin containing up to and including about 18 carbon atoms with a catalyst consisting essentially of a boron compound selected from the group consisting of aliphatic and alicyclic hydrocarbon boron compounds which are liquid in the reaction system, have at least one boron to carbon linkage, and wherein the hydrocarbon groups contain up to and including about 10 carbon atoms.

5. The process of claim 2 wherein said catalyst is a trialkyl boron compound and said internal olefin is a straight chain hydrocarbon olefin.

6. The process of claim 5 further defined in that said catalyst is employed in amount between about 10 to 20 mol percent based upon said internal olefin.

7. The process of claim 6 further defined in that the terminal olefin product is simultaneously fractionated from the reaction system.

8. The process of claim 7 further defined in that the reaction is conducted in the presence of an ether.

9. A process for the production of an olefin having a terminal double bond wherein an olefinic hydrocarbon having the same carbon skeleton as the olefin produced and having an internal double bond is reacted with an alkylborane at a temperature of from 125° C. to 250° C. to displace the alkyl groups of said alkylborane and form a second alkylborane whose alkyl groups have the same carbon skeleton as said olefinic hydrocarbon; heating said second alkylborane at a temperature of from 125° C. to 250° C. and decomposing said second alkylborane and recovering an olefin having a terminal double bond.

10. A process for the production of an olefin having a terminal double bond wherein an olefin hydrocarbon having the same carbon skeleton as the olefin produced and having an internal double bond is reacted with an alkylborane at a temperature of from 125° C. to 250° C. for a time sufficient for the olefin to react and form said olefin with the terminal double bond and recovering said olefin.

11. A process for the production of an arylalkenyl compound having a terminal double bond wherein an arylalkenyl compound having the same carbon skeleton as the compound produced, and having an internal double bond in the alkenyl group, is reacted with a boron compound selected from the group consisting of diborane and alkyl boron compounds at temperatures and for a time sufficient to react and form said arylalkenyl compound with the terminal double bond, and recovering the compound so formed.

References Cited by the Examiner
UNITED STATES PATENTS

| | | | |
|---|---|---|---|
| 2,403,671 | 7/46 | Matuszak | 260—683.2 |
| 2,461,004 | 2/49 | Soday | 260—683.2 |
| 2,477,290 | 7/49 | Dornte et al. | 260—683.2 |
| 2,840,551 | 6/58 | Field et al. | 252—432 |

ALPHONSO D. SULLIVAN, *Primary Examiner.*

ALLAN M. BOETTCHER, *Examiner.*